United States Patent [19]

Glesmann et al.

[11] Patent Number: 4,642,604
[45] Date of Patent: Feb. 10, 1987

[54] AUXILIARY LUBRICATION PUMP APPARATUS

[75] Inventors: Herbert C. Glesmann, Omaha, Nebr.; Ronald G. Thomas, Nashville, Tenn.

[73] Assignee: Remco, Omaha, Nebr.

[21] Appl. No.: 693,659

[22] Filed: Jan. 22, 1985

[51] Int. Cl.$^4$ .............................................. B60Q 1/00
[52] U.S. Cl. ........................................ 340/60; 417/63; 74/467; 340/52 R
[58] Field of Search ............... 280/421; 340/52 R, 60, 340/52 D, 52 F; 74/467; 417/63

[56] References Cited

U.S. PATENT DOCUMENTS 3,409,873 11/1968 Duffy .................................. 340/642
4,110,733 8/1978 Williams .............................. 340/60
4,222,028 9/1980 Danchilla ......................... 340/52 D
4,489,305 12/1984 Lang et al. ............................ 340/60

*Primary Examiner*—Glen R. Swann, III
*Assistant Examiner*—Jeffery A. Hofsass
*Attorney, Agent, or Firm*—Henderson & Sturm

[57] ABSTRACT

An auxiliary lubrication pump apparatus for use with towed vehicles having an automatic transmission. The apparatus includes a lubrication pump, a selector valve, a pressure sensing unit, a pump relay and a control unit and a display unit. The control unit includes a timer for sounding an alarm to alert the driver to activate the apparatus when the engine switch of the towing vehicle has been initiated. If pressure in the lubrication cycle drops below an acceptable level, or if electrical power to the apparatus fails, an audible alarm and visual alarm will be provided to the operator of the towing vehicle.

5 Claims, 4 Drawing Figures

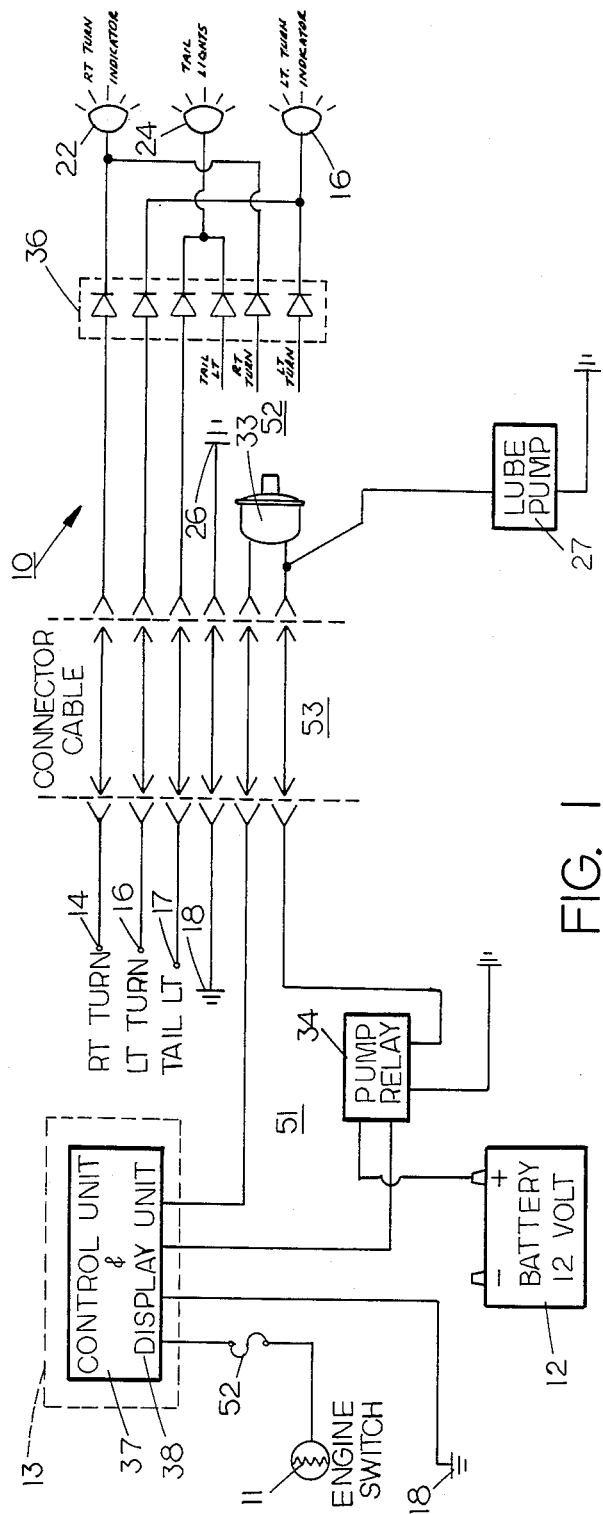
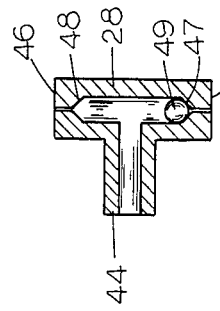
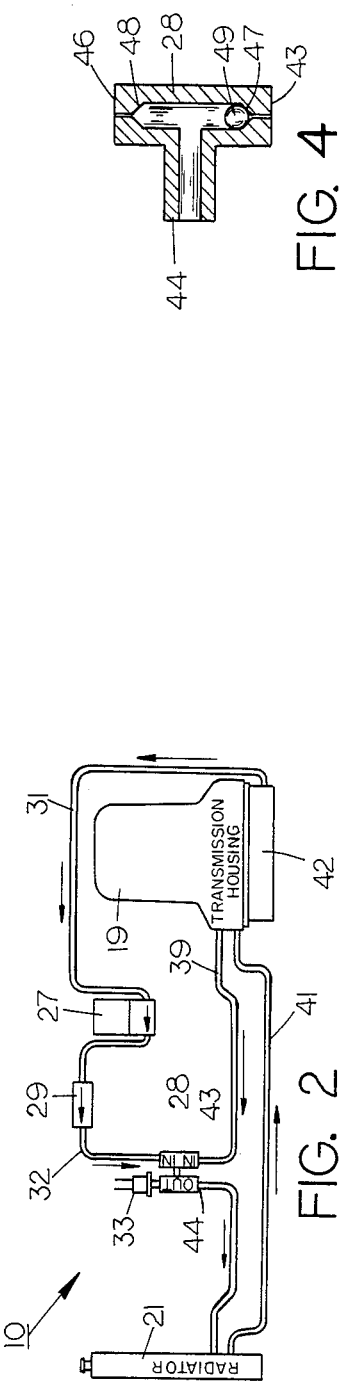
FIG. 1
FIG. 2
FIG. 4

AUXILIARY LUBRICATION PUMP APPARATUS

TECHNICAL FIELD

This invention relates generally to lubrication pumps, and more particularly to auxiliary lubrication pump apparatus as used in towed vehicles.

BACKGROUND ART

Automobiles are towed for a variety of reasons. When the towing distances involved are short, no major problems need be expected. When the towing distances are longer, however, a high risk of damaging the automatic transmission of the towed vehicle develops.

For rear wheel drive vehicles, the prior art has proposed at least two solutions. First, the towed vehicle may be towed on a trailer, thereby avoiding contact between the ground and the rear wheels of the vehicle. This solution comprises an expensive and awkward solution. In addition, towing a vehicle in this way does not ensure efficient mileage for the towing vehicle.

As an alternative solution, some operators disconnect the drive shaft of the towed vehicle. Once disconnected, the automatic transmission will no longer experience wear or damage during the towing operation.

For front wheel drive vehicles, disconnection of the drive train from the wheels does not constitute a generally acceptable solution. While disconnection of the drive shaft in a rear wheel drive vehicle can be accomplished in a rather straightforward manner, our front wheel drive vehicles present problems that make this alternative less than desirable.

As a result, auxiliary lubrication pumps have been utilized. Such lubrication pumps are utilized to keep transmission fluid moving through the existing transmission lubrication circuit to ensure that the transmission will not be damaged when towing the vehicle.

Though this represents an adequate solution to the problem, certain concerns still exist. For instance if the lubrication pump should fail, or if the transmission fluid hoses should break or become uncoupled, or if power should be accidently diverted, or any other mishaps develop, then protection to the automatic transmission will be denied and no warning will be provided to the operator of the towing vehicle. As a result, the precise damage sought to be avoided can result.

In an attempt to alleviate this problem, some prior art devices have included pump monitors and the like that provide a signal to the operator in the event that the pump does not operate properly. Even these efforts have not been wholly satisfactory. For instance, the pump can continue operating, but the fluid hoses can become defective for a number of reasons, and the existence of this situation will not be imparted to the operator. Further, the prior art systems do not provide any appropriate warning of power failures.

There therefore exists a need for an auxiliary lubrication pump apparatus that provides adequate lubrication protection for an automatic transmission in a towed vehicle and that further provides assurances to an operator in a towing vehicle that the lubrication pump apparatus continues to operate in an appropriate manner. In addition, such an apparatus should be relatively inexpensive to manufacture, durable and reliable.

DISCLOSURE OF INVENTION

These needs and others are met through provision of the invention disclosed herein. This apparatus is intended for use with a towing vehicle having an engine switch (for either a gasoline or diesel engine), a battery, an interior compartment, a right turn signal generator, a left turn signal generator, a tail light control unig and an electrical ground, and a towed vehicle having an automatic transmission, a transmission fluid cooler unit, a right rear turn indicator, a rear left turn indicator, tail lights and an electrical ground. The auxiliary lubrication pump apparatus itself includes a lubrication pump, a selector valve, a filter, a pressure sensing unit, a transmission to pump hose, a pump to selector valve hose, a pump relay, a tail light and turn indicator diverter, a control unit and a display unit.

The input port of the lubrication pump connects to the fluid reservoir system of the automatic transmission of the towed vehicle through use of the transmission to pump hose. The pump to selector valve hose then connects the output port of the lubrication pump to a selector valve. The selector valve connects to the already existing fluid line between the automatic transmission and transmission fluid cooler unit of the towed vehicle. The filter may be placed in line between the selector valve and the lubrication pump, and serves as an additional protective aid to guard the integrity of the transmission components.

The pressure sensing unit may be appropriately located to sense pressure in the fluid transmission hoses. The pump relay may be located in the towing vehicle and serves to reduce power requirements of the engine switch and to activate the lubrication pump upon direction of the operator of the towing vehicle. The tail light and turn indicator diverter may be provided in the towed vehicle to allow the right turn indicator unit, the left turn indicator unit, and the tail light control unit of the towing vehicle to automatically assume control over the rear right turn indicator, the rear left turn indicator, and tail lights of the towed vehicle.

The control unit includes a timer unit, a switch unit, a relay, an audible alarm unit and a failure mode detection unit. The switch unit provides an operator controlled switch in the interior compartment of the towing vehicle to allow an operator to control the apparatus.

Upon activating the engine switch of the towing vehicle, the timer unit of the control unit will automatically begin a countdown. During this time period, the audible alarm unit will provide an audible signal to alert the operator that the apparatus (10) has not been activated during this countdown, the audible alarm unit provides an audible signal to alert the operator of this situation, and a red light included with the display unit will be illuminated.

Upon activating the switch unit, the lubrication pump will be initiated, and the failure mode detection unit will monitor for both pressure failures and electrical failures. In the event of either, the audible alarm unit will be activated and the red light of the display unit will be illuminated.

During normal pumping operation of the apparatus, a green light in the display unit will be provided to assure the operator of normal operation.

So configured, an operator can obtain the benefits of auxiliary lubrication pump protection, while remaining assured that the system operates properly.

BRIEF DESCRIPTION OF THE DRAWINGS

These and other attributes of the invention will become more clear upon a thorough review and study of the following description of the best mode for carrying out the invention, particularly when reviewed in conjunction with the drawings, wherein:

FIG. 1 comprises a block diagram view of the electrical apparatus;

FIG. 2 comprises a fluid diagrammatic view of the apparatus as connected to the automatic transmission system of a towed vehicle;

FIG. 4 comprises a sectioned side elevational view of the selector valve.

BEST MODE FOR CARRYING OUT THE INVENTION

Figure 3:
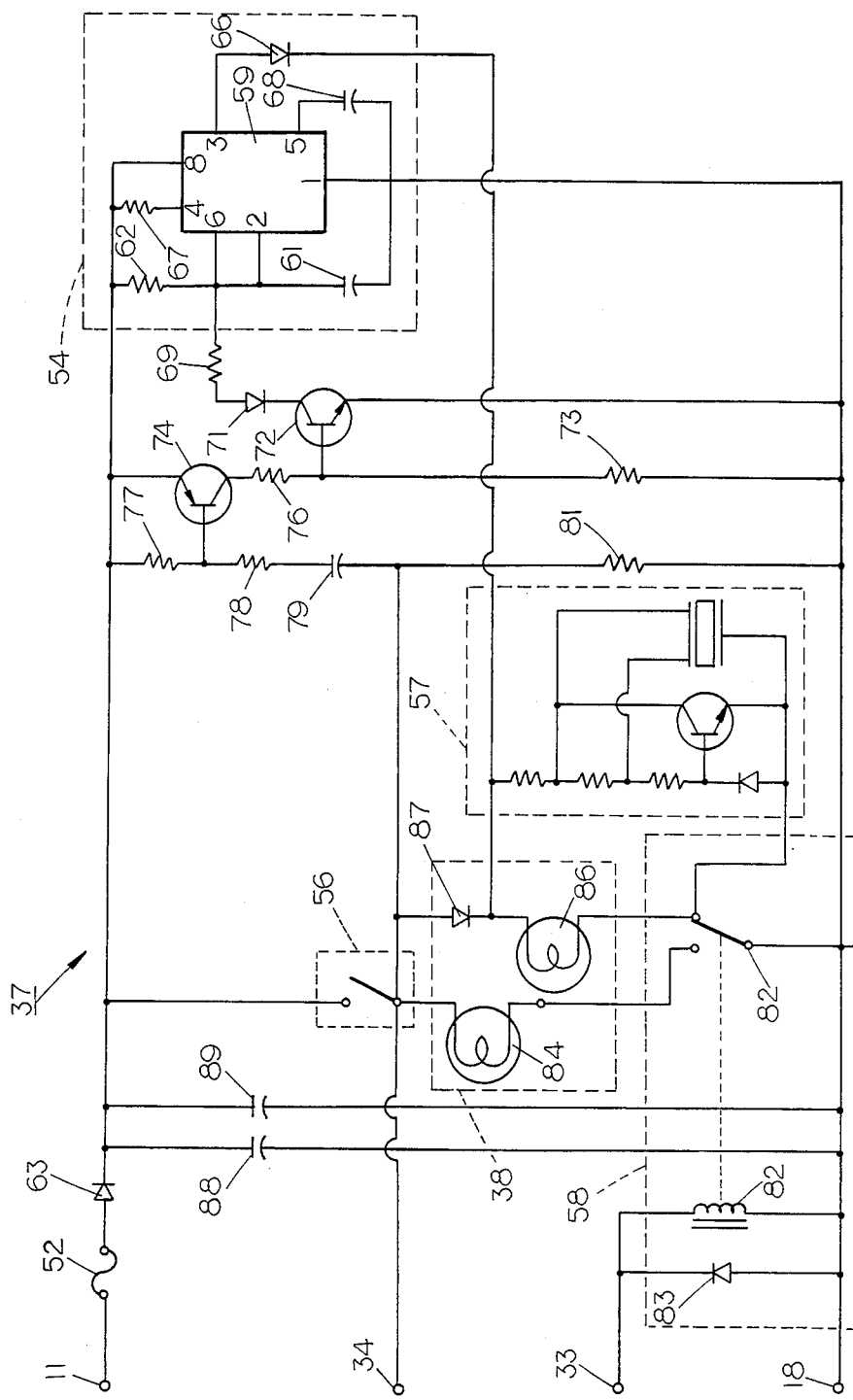
FIG. 3 comprises an electrical schematic diagram of the control unit and display unit.

Referring now to the drawings, and in particular to FIGS. 1 and 2, the apparatus of the invention can be seen as generally depicted by the numeral 10. The apparatus (10) is intended for use with a towing vehicle having an engine switch (11), a battery (12), an interior compartment (13), a right turn signal generator unit (14), a left turn signal generator unit (16), a tail light control unit (17), and a system ground (18). The apparatus (10) is further intended for use with a towed vehicle having an automatic transmission (19) (FIG. 2), a transmission fluid cooler unit (21), a rear right turn indicator (22) (FIG. 1), a rear left turn indicator (23), tail lights (24) and a system ground (26). The apparatus (10) itself may be generally comprised of a lubrication pump (27), a selector valve (28) (FIG. 2), a filter (29), transmission to pump hose (31), a pump to selector valve hose (32), a pressure sensing unit (33), a pump relay (34) (FIG. 1), tail light and turn indicator diverters (36), a control unit (37) and a display unit (38). Each of these generally described components of the apparatus (10) will now be described in more detail in seriatim fashion.

Referring to FIG. 2, the automatic transmission (19) of the towed vehicle connects to a transmission fluid cooler unit (21) through an existing out-flow hose (39) and an existing in-flow hose (41). The lubrication pump (27), as provided through use of a one-eighth horsepower self-priming pump, may have its input port connected to the pan (42) of the transmission (19) by use of a transmission to pump hose (31).

With reference to FIG. 4, the selector valve (28) has been depicted diagrammatically to disclose its shuttle configuration. The selector valve (28) has two inlet ports (43 and 46) and one outlet port (44). Each inlet port (43 and 46) has a seat (47 and 48), and a common ball (49) that can move between the two seats depending upon the direction of fluid flow. The exact operation of the selector valve (28) in conjunction with the apparatus (10) will be made more clear below. The selector valve (28) has one of its input ports (43) connected to the out-flow hose (39), and its output port (44) connected to the out-flow hose (39) as well.

Again referring to FIG. 2, the second input port (46) of the selector valve (28) connects to the output port of the lubrication pump (27) through use of a pump selector valve hose (32). If desired, a filter (29) can be placed in line with the pump to selector valve hose (32).

The pressure sensing unit (33), as provided through use of a line Tee, may be appropriately connected to monitor the existence of pressure, and hence fluid flow, through the selector valve (28). The significance of this position will also be made more clear below.

Having now described the fluid connections of the apparatus (10), the general electrical connections will now be described. Referring to FIG. 1, relevant connections with respect to the towing vehicle (51) will be described first.

The engine switch (11) of the towing vehicle (51) connects through a 1 ampere fuse (52) to the control unit (37) as described below. The electrical ground for the towing vehicle also connects to the control unit (37). The positive terminal of the 12 volt battery (12) connects to the pump relay (34). The pump relay also connects to the control unit (37), to ground and to the pressure sensing unit (33), the lubrication pump (27) of the towed vehicle (52) through a 6 conductor connector cable (53).

The right turn signal generator unit (14), the left turn signal generator unit (16), and the tail light control unig (17) connect to the tail light and turn indicator diverter (36) of the towed vehicle (52) through the connector cable (53). Finally, the control unit (37) connects to the pressure sensing unit (33) through the connector cable (53) as well.

So configured, power from the towing vehicle battery (12) may be provided to the pressure sensing unit (33), and the lubrication pump (27), of the towed vehicle (52) through manipulation of the pump relay (34) by the control unit (37). In addition, the control unit (37) can receive electrical signals from the pressure sensing unit (33) and can further monitor the electrical integrity of the lubrication pump circuitry.

Further, the tail light and turn signal diverter (36) automatically allow either the towing vehicle (51) or the towed vehicle (52) to control the rear right turn indicator (22) without power feed back from one vehicle to the other. Similarly, the diverters (36) operate to prevent power feed back on the left turn indicator (16) and the tail lights (24).

Referring now to FIG. 3, the control unit (37) and the display unit (38) will now be described in more detail.

The control unit (37) can be comprised generally of a timer unit (54), a switch unit (56), an audible alarm unit (57) and a failure mode detection unit (58). The timer unit can be generally constructed about a 555 timer (59). The ground port (pin 1) of the timer (59) can be connected to ground. The trigger port (pin 2) can be connected to pin 1 through a 33 microfarad 25 volt electrolytic capacitor (61), to pin 6, and through a 220 K ohm resistor (62) (all resistors described herein are one-quarter watt unless otherwise specified) to the towing car engine switch (11) through a 1N4001 diode (63) and a 3AG 1 amp fuse (64). The output port (pin 3) connects through a 1N4001 diode (66) to the audible alarm unit (57) and the display unit (38) as described in more detail below.

The reset port (pin 4) connects through a 1 K ohm resistor (67) to the towing vehicle engine switch (11). The control voltage port (pin 5) connects to ground through a 0.047 microfarad 25 volt disk capacitor (68). The threshold port (pin 6) connects to pin 2 and through a series connected 15 K ohm resistor (69) and a 1N914 diode (71) to the collector of a PN2222 transistor (72). Finally, the voltage supply port (pin 8) connects to the engine switch (11) of the towing vehicle (51).

The emitter of the PN2222 transistor (72) described above connects to ground, and its base connects to ground through a 150 ohm resistor (73) and to the collector of a 2N4403 transistor (74) through a 1 K ohm resistor (76). The emitter of the 2N4403 transistor (74) connects to the engine switch (11). The base of this transistor (74) connects to the engine switch (11)

through a 10 K ohm resistor (77), and through a series connected 15 K ohm resistor (78) and a 33 microfarad 25 volt electrolytic capacitor (79) to a grounded 10 K ohm resistor (81) and to the pump relay (34).

The audible alarm unit (57) may be comprised of a Panasonic EFB-CA 25A01 piezo ceramic buzzer. One input of the buzzer connects to the output of the timer (59) as disclosed above, and the remaining output can be connected to ground through a 12 volt DC signal pole double throw 5 amp control relay (82) as contained in the failure mode detection unit (58).

The failure mode detection unit (58) has the control relay (82) described above, with the solenoid terminals having a 1N4001 diode (83) connected thereacross, and with one terminal being connected to ground and the remaining terminal being connected to the pressure sensing unit (33).

With the relay core energized, the normally open pole connects to a green lamp (84) in the display unit (38). The normally closed terminal connects to the audible alarm unit (57) and to a red lamp (86) contained in the display unit (38). The remaining terminal of the red lamp (86) connects to the output of the timer unit (59) and through a 1N4001 diode (87) to the pump relay (34).

The switch unit (56) may be comprised of a rocker-type single pole single throw switch having one terminal connected to the pump relay (34) and the remaining terminal operably affixed to the engine switch (11).

Finally, a 0.047 microfarad 25 volt disk capacitor (88) and a 33 microfarad 25 volt electrolytic capacitor (89) connects in parallel between the engine switch (11) and ground.

Operation of the apparatus (10) may now be described as follows. With the engine switch (11) on and the control unit (37) and display unit (38) mounted in the interior compartment (13) of the towing vehicle (51), the switch unit (56) may be closed. Closing this switch energizes the pump relay (34), which in turn allows power from the battery (12) to be provided to the pressure sensing unit (33) and the lubrication pump (27). So long as the pressure sensing unit (33) senses an adequate pressure reading in the monitored portion of the fluid flow line, the failure mode detection unit relay (82) will be energized through the pressure switch and transfer to its normally open position and the green light (84) will be displayed to the operator of the towing vehicle (51).

If, for any reason, pressure in the monitored flow line should drop below an acceptable level, the failure mode detection unit (58) will be deenergized by the pressure sensing unit (33), allowing the control relay to change position. This will cause the green light (84) to extinguish, and the red light (86) to become illuminated. In addition, the audible alarm unit (57) will be enabled and an appropriate audible alarm will be provided in the interior compartment (13) of the towing vehicle (51) to alert the operator of the problem.

It should be appreciated that the apparatus (10) as configured requires a position signal to assure a green light. If a power failure should develop, or if pressure should fail for any reason, then the alarm functions of the control unit (37) and display unit (38) will occur in the default condition. This avoids the prior art limitations that fail to provide an adequate warning under certain failure modes.

The timer unit (54) serves the following function. When the operator of the towing vehicle (51) first initiates the engine switch (11), the timer unit (54) becomes activated. The timer unit (54) will then activate a countdown sequence, during this established sequence an output signal will be provided that will power the red light (86) and the audible alarm unit (57). This will serve to remind the operator (51) that the switch unit (56) has not yet been activated and that if the towed vehicle (52) is moved, damage to the automatic transmission may result. To remedy this condition, the operator need only close the switch unit (56) to deactivate the alarms and to initiate the lubrication pump (27) function.

In addition, should the switch unit on the control panel accidentally be turned off while operating the vehicle, the 33 microfarad capacitor (79) will cause current to flow through the two transistors (74 and 72) and reset the timer through 1N914 diode (71) and the 15 K ohmn resistor (69). This will alert the operator so he can reclose the switch unit.

Obviously, numerous modifications and variations of the present invention are possible in light of the above teachings. It is therefore to be understood that within the scope of the appended claims, the invention may be practised otherwise than as specifically described therein.

I claim:

1. An auxiliary lubrication pump apparatus for use with a towing vehicle having an engine switch, a battery, and an interior compartment, and a towed vehicle having an automatic transmission which requires forced lubrication while being towed, the apparatus comprising:
    (a) a lubrication pump;
    (b) a transmission to pump hose connected between said automatic transmission and said lubrication pump;
    (c) a valve having at least one signal output and two inputs;
    (d) a hose means for connecting an output of said lubrication pump to one of said inputs of said valve;
    (e) a first outflow hose for connecting said automatic transmission to another input of said valve;
    (f) a second output hose for connecting said output of said valve to said automatic transmission;
    (g) pressure sensing means positioned to sense pressure as regards said second outflow hose; and
    (h) control means responsive to said pressure sensing means and having switch means for providing electricity to said lubrication pump and to provide an alarm whenever said control means detects through said pressure sensing means that inadequate pressure exists.

2. The apparatus of claim 1 wherein said control means further includes timer means for providing an alarm until said switch means has been activated within a preselected time period following activation of said engine switch of said towing vehicle.

3. The apparatus of claim 2 wherein said control means includes audible alarm means for providing said alarms in said interior compartment of said towing vehicle.

4. The apparatus of claim 3 wherein said apparatus further includes display means for providing a visual indication in said interior compartment of said towing vehicle that said audible alarm means has been activated.

5. The apparatus of claim 4 wherein said display means further includes a second visual indication in said interior compartment for indicating when said switch means is on and when said apparatus is functioning normally.

* * * * *